April 11, 1950  O. W. LOUDENSLAGER  2,504,077
CROSS-WIND AIRPLANE LANDING GEAR
Filed April 14, 1947  2 Sheets-Sheet 1

Inventor
Oscar W. Loudenslager
By
A. H. Oldham
Attorney

April 11, 1950     O. W. LOUDENSLAGER     2,504,077
CROSS-WIND AIRPLANE LANDING GEAR
Filed April 14, 1947     2 Sheets-Sheet 2
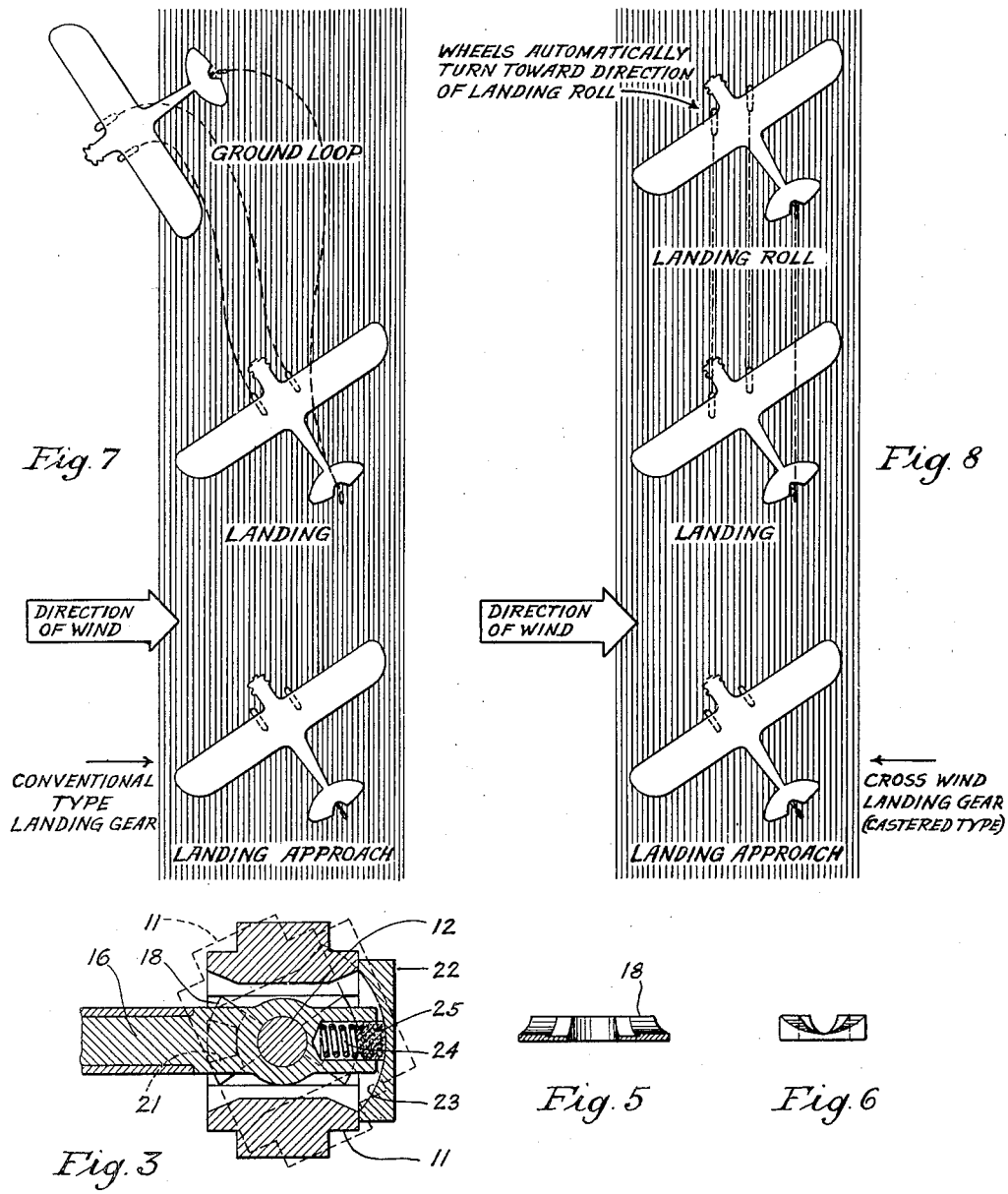
Inventor
Oscar W. Loudenslager Patented Apr. 11, 1950

2,504,077

UNITED STATES PATENT OFFICE 2,504,077

CROSS-WIND AIRPLANE LANDING GEAR

Oscar W. Loudenslager, Akron, Ohio, assignor to the United States of America as represented by the Secretary of Commerce Application April 14, 1947, Serial No. 741,198

7 Claims. (Cl. 244—103)

This invention relates to airplane main landing gears, and in particular, to a main landing gear which makes it possible for an airplane to safely land and take off in a cross-wind on a one-strip runway of an airfield without overturning or groundlooping.

On a single-runway landing field it is in many cases extremely difficult, if not impossible to land an airplane in a strong cross-wind, especially when the wind has a direction of as much as 90 degrees to the landing strip or runway.

The present invention, however, makes landings and take-offs under such conditions possible without difficulty. This is accomplished by not only using a caster nose or tail wheel, as the case may be, but also caster main wheels. This invention has been tested in many cross-wind landings by many different pilots and demonstrates definitely that an airplane equipped therewith can be safely landed under rather extreme wind conditions which would prevent the conventional plane from landing.

Heretofore it has been known to provide airplane landing wheels as well as helicopter landing wheels with caster devices, however, it is not known to have found general application, because of various unsolved difficulties connected therewith of which shimmying is one which must be avoided. Cost, weight, and functional failures have been other difficulties.

It is the general object of the invention to avoid and overcome the foregoing and other difficulties of and objections to prior art practices by the provision of a more suitable caster device which forms an integral part of a standard airplane main wheel, and which is simple in construction, light in weight, relatively cheap in manufacture and reliable in operation.

Another object of the invention is to produce a wheel castering device which is independent of the special construction of a landing gear and can be used equally well with a more or less rigid landing gear frame or in connection with a vertical, flexible or hydraulic landing strut. Another object of the invention is to make it possible for an airplane to land on, and to take-off safely from a one-strip landing field in strong cross winds blowing at up to 90 degree angle against the runway.

Another object of the invention is to increase the efficiency and reduce the operating cost of new and smaller landing fields nearer to cities by allowing more landings on less runways.

The aforesaid objects of the invention, and other objects will become apparent as the description proceeds are achieved as follows:

In the construction of the invention to keep the main wheels of an airplane in the direction of the runway, even though landing in a crosswind with the airplane turned partially into the wind, the wheels are made to caster a certain angle to each side from its zero position about a king pin mounted in a support within the wheel bearings. This king pin is positioned in and substantially at right angle to the wheel axle in the center plane of the wheel and with its longitudinal axis intersecting the ground at a point forward of the wheel ground contact. However, the king pin may be somewhat offset from the wheel center, either laterally or longitudinally and still answer the purpose. A spring loaded cam, arranged in fixed position within the wheel at the bottom end of and swingable about the king pin which passes through the wheel axle and is slidable therein, serves to raise the airplane slightly as the wheel casters thus providing necessary static stability. This stability is accomplished through a cam follower riding on the cam which has the tendency to prevent the wheel from shimmying when the plane rolls on the ground and also returns the wheel to zero position when off-ground. Additional dampening means in the form of a friction device assist to minimize lateral oscillations of the wheel. Besides, the wheel is provided with a conventional spot disk brake, not a part of this invention, which is very suitable because of limited space.

For a better understanding of the invention reference should be had to the accompanying drawings, wherein:

Fig. 3 is a fragmentary horizontal cross-sectional view of the wheel axle taken on line III—III of Fig. 1.

Fig. 4 is a plan view of a cam detail inserted at the bottom of the king pin support.

Fig. 5 is a cross-sectional view taken on line V—V of Fig. 4.

Fig. 6 is a cam end view.

Fig. 7 illustrates the effect of a cross-wind at a landing on an airplane having non-castering main wheels, and Fig. 8 shows in comparison to Fig. 7 the behavior at a landing at the same wind condition of an airplane provided with main caster wheels, according to the invention.

Figure 2:
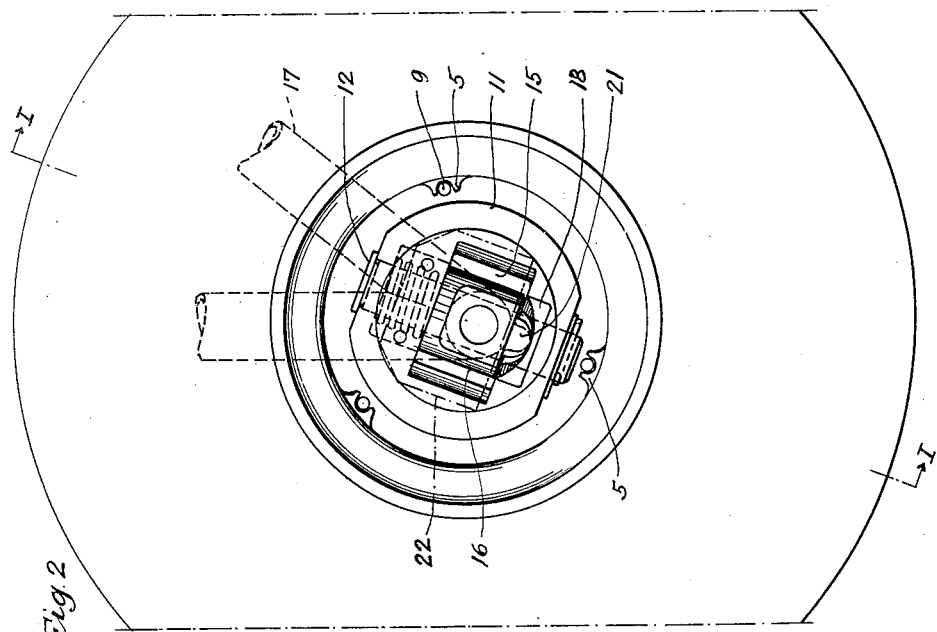
Fig. 2 is a fragmentary outside side view of Fig. 1 shown with the bearings and outer bearing ring removed.
Figure 1:
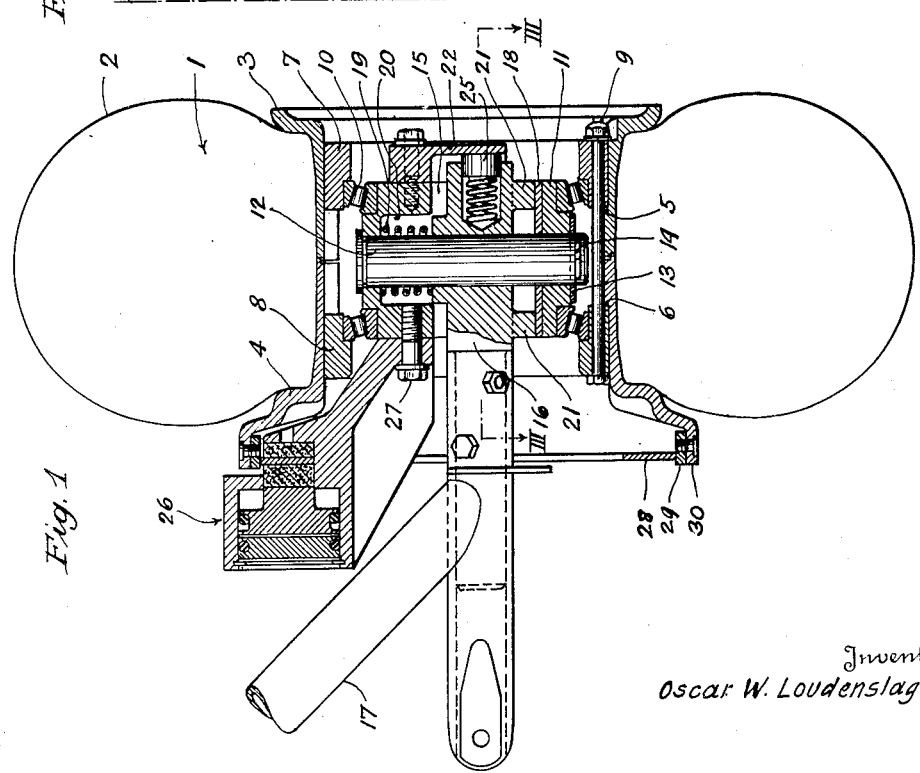
Fig. 1 is a cross-sectional view of a castered main landing wheel, according to the invention, taken on line I—I of Fig. 2.

Although the principles of the invention have been found particularly applicable for light airplanes, there is no apparent limit to their application for land airplanes in general.

With specific reference to the drawings, the numeral 1 indicates, in general, a castered main wheel for an airplane consisting of a rubber tire 2 inserted between the rim parts 3 and 4 having a number of spacers 5 and 6, respectively, distributed over the circumference, against which the outer bearing supports 7 and 8 are clamped by bolts 9. Roller bearings 10 inserted with their outer races into the bearing supports 7 and 8 have fitted between and within their inside races a non-rotatable hub 11 which carries a king pin 12 passing through the center thereof and being secured thereto by a washer 13 and a cotter pin 14. Through a transverse opening 15 in the king pin support 11 passes, radially spaced from the inner walls thereof, the wheel stub axle 16 attached to the airplane landing frame 17, and in the outer end of which the king pin 12 pivots allowing the wheel to caster about 25 degrees to either side from its center position.

Into the bottom portion of the opening 15 is fitted a cam 18 held in position by the king pin 12 and with which under pressure of the spring 19 in the recess 20 cooperates a set of oppositely arranged cam followers 21 extending from the underside of the stub axle 16 to retain the wheel to zero position.

As seen in Fig. 2 the king pin 12 is positioned at an angle to the vertical so that even with a raised tail end of an airplane the intersection of the king pin axis with the ground is always forward of the wheel ground contact to provide positive caster action of the wheel. In castering the wheel the cam followers sweeping over the cam will tend to lift the airplane about the same amount as the loss of wheel height due to the change of the vertical position of the wheel into a leaning position (because of the angle of king pin with the vertical), thus keeping the plane always at the substantially same height.

In Fig. 3 are shown by dash lines the extreme angular positions of the wheel to which it can swing out in both directions, that is, until the inner broken edges of the king pin support 11 will touch the stub axle 16. The cam 18 shown by itself in Figs. 4, 5 and 6 is rather low to enable the wheel to caster in either direction with little effort which makes castering a smooth operation to avoid jerks and reduce shimmying. Also, because of the symmetrical shape of the cam, it will readily bring back the wheel, when off the ground, to its zero position, that is parallel to the longitudinal axis of the airplane.

In order to dampen smaller lateral wheel motions or secondary vibrations due to uneven ground a friction element 22 is provided, having at its inner side a cylindrical surface 23 equidistant to the king pin axis against which is pressed, by a spring 24, a preferably cylindrical friction block 25.

A standard spot disk brake, indicated as a whole at 26, is attached by bolts 27 to the inner side of the king pin support 11 to cooperate with the brake disk 28 held by keys 29 fastened to the brake flange 30 integral with the wheel rim 4. A brake of this type is especially suitable, as in this case, the available space is limited.

In operating this type of landing gear it has been found that a castering angle of 25 degrees in either direction from the zero position of the wheel is ample to safely land and to take-off an airplane in a 90 degree side wind of about 30 miles an hour. This angle, however, may be varied somewhat for different type of airplanes; and, also, the angle of about 21 degrees between the king pin axis and the vertical which was found suitable may be increased or decreased in specific installations.

To illustrate the difference between a landing in a strong cross-wind of an airplane equipped with conventional main landing wheels and an airplane equipped with caster main landing wheels, according to the invention, it is seen, in Fig. 7, how the airplane having the conventional wheels is forced to a ground loop which may endanger the plane and the occupants. Whereas in Fig. 8, is shown an airplane, having caster main landing wheels which after having touched the ground keeps moving in the direction of the runway, since the main landing wheels in touching the ground swing from their zero position, that is, parallel to airplanes longitudinal axis into the direction of the runway without any difficulty, thereby allowing the airplane to complete its landing run.

The advantage of the invention does not consist only in the improvement in the landing and take-off qualities of an airplane but also lies in the increased usefulness and reduced cost of airports.

It will be recognized that the objects of the invention have been achieved by the replacement of the conventional main airplane landing wheels by caster wheels which can be applied to any airplane construction with little or no change in the design of an airplane undercarriage or shock strut construction. Instead of grounding an airplane for indefinite time or making a landing impossible because of high cross winds this invention avoids such handicaps, saving time, money, material and lives.

While in accordance with the patent statutes one best known embodiment of the invention has been illustrated and described in detail, it is to be particularly understood that the invention is not limited thereto or thereby, but that the inventive scope is defined in the appended claims.

What is claimed is:

1. In an airplane main landing gear suitable for making cross-wind landings, a landing wheel, a hollow hub rotatably mounted in said wheel, an axle passing through said hub and, being radially spaced therefrom and radially movable therein, and a castering device mounted in said hub and in said axle and having its axis substantially in the longitudinal center plane of the wheel at an angle with the vertical so that its intersection with the ground even with the tail end of an airplane in high position is forward of the wheel ground contact for automatically changing at a landing the longitudinal alignment of the landing wheel into angularly limited positions in opposite directions.

2. In an airplane main landing gear suitable for making cross-wind landings, a landing wheel, a hollow hub in said wheel, bearings rotatably connecting said hub and said wheel, an axle in said hub being radially spaced therefrom and radially movable therein having downwardly extending cam followers, a king pin being in substantially diametrical position in said hub and passing slidably through said axle for castering said wheel in opposite directions from a longitudinal alignment to angularly limited positions thereto, a cam inserted in said hub underneath said axle in continuous contact with said cam followers for urging the wheel into longitudinal alignment, and means directly responsive to the weight of the airplane on the wheel for pressing said axle with its cam followers against said cam.

3. In an airplane main landing gear suitable for making cross-wind landings, a landing wheel, a hollow hub in said wheel, bearings rotatably connecting said hub and said wheel, an axle in said hub being radially spaced therefrom and radially movable therein having downwardly extending cam followers, a king pin being in substantially diametrical position in said hub and passing slidably through said axle for castering said wheel in opposite directions from a longitudinal alignment to angularly limited positions thereto, a cam inserted in said hub underneath said axle in continuous contact with said cam followers for urging the wheel into longitudinal alignment, a spring inserted in said hub for pressing said axle with its cam followers against said cam, and a friction device adjacent the free end of the axle for resisting lateral movement of the wheel.

4. In an airplane main landing gear including a pair of caster wheels, a hollow wheel hub having a circumferential wall about which the wheel rotates, a king pin held diametrically in said hub wall and at an angle with the horizontal, an axle radially spaced from said hub and movable along said pin, said axle having downwardly extending cam followers, a cam inserted in said hub and being held by said pin in frictional contact with said cam followers, said cam followers bearing the weight of the airplane, and a spring between said hub wall and said axle for urging the wheel from a castered position into centered position when there is no weight on the wheel.

5. In an airplane main landing gear including a pair of caster wheels, a hollow wheel hub having a circumferential wall about which the wheel rotates, an axle passing through and being radially spaced from said hub, a complete cam castering device mounted on and within said hub walls adapted to permit said axle to radially move upwardly in said hub in the direction of the caster axis when the wheels caster approximately an amount equal to the decrease of half the height of the wheel due to its leaning position to always maintain substantially the same height of the airplane, and a friction device having a concave cylindrical friction part attached to the outer end of the wheel hub and a cooperating friction part resiliently inserted in said axle.

6. A castering wheel for an airplane main landing gear including an axle, a wheel journaled for rotary movement in association with the axle, means pivotally supporting the wheel for castering movement, means responsive to the full weight on the wheel tending to return it from a castered position to longitudinal alignment, resilient means tending to return the wheel to longitudinal alignment particularly when there is no weight on it, and friction means for assisting in damping wheel shimmy independent of the weight of the wheel.

7. A castering wheel for an airplane main landing gear including an axle, a wheel journaled for rotary movement in association with the axle, means pivotally supporting the wheel for castering movement, means responsive to the full weight on the wheel tending to return it from a castered position to longitudinal alignment, and resilient means tending to return the wheel to longitudinal alignment particularly when there is no weight on it.

OSCAR W. LOUDENSLAGER.

REFERENCES CITED

The following references are of record in the file of this patent:

UNITED STATES PATENTS

| Number | Name | Date |
|---|---|---|
| 1,810,054 | Miller | June 16, 1931 |
| 1,834,857 | Messier | Dec. 1, 1931 |
| 2,333,550 | Parker | Nov. 2, 1943 |

FOREIGN PATENTS

| Number | Country | Date |
|---|---|---|
| 542,648 | Great Britain | Jan. 21, 1942 |
| 883,921 | France | Apr. 5, 1943 |